United States Patent Office 2,897,110
Patented July 28, 1959

2,897,110

METHOD OF DESTROYING FUNGI AND NEMATODES EMPLOYING TRIMETHYL THIOPHOSPHITE

Carleton B. Scott, Pomona, Calif., assignor, by mesne assignments, to Collier Carbon and Chemical Corporation, a corporation of California No Drawing. Application April 19, 1957
Serial No. 653,752

6 Claims. (Cl. 167—22)

This invention relates to novel compositions of matter useful as fungicides and nematocides, and in particular concerns fungicidal and nematocidal compositions comprising trimethyl thiophosphite as the active ingredient. It further concerns methods for controlling plant fungi and nematodes.

The invention is based on my discovery that trimethyl thiophosphite is highly toxic with respect to fungi and nematodes but is substantially non-phytotoxic, particularly when applied to soil which is infested with such pest organisms. As is disclosed by Stevens and Spindt in U.S. Patent No. 2,542,370, trimethyl thiophosphite is readily prepared by reacting methyl disulfide with elemental phosphorus at a temperature of about 200° C. in the absence of oxygen.

The fungicidal and nematocidal compositions provided by the present invention essentially comprise trimethyl thiophosphite and an inert pesticidal carrier material which may be either liquid or solid. When the composition is to take the form of a liquid spray or dip, the inert carrier material is usually water and the active ingredient is maintained dispersed or suspended therein with the aid of an organic dispersing agent. Alternatively, the thiophosphite may be mixed with an inert solid carrier material such as talc, diatomaceous earth, aluminum silicate, etc. to form dry compositions which can be employed as such in the form of dusts or which can be dispersed in an aqueous or oleaginous medium to form a liquid spray. In general, any of the conventional formulation and application techniques may be followed in employing the present compositions, and any of the known wetting agents, spreaders, sticking agents, diluents, etc. may be employed in combination with such products.

Trimethyl thiophosphite is effective in relatively small quantities, and in the interests of economy it is usually applied at concentrations of the order of 50–4000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrate compositions usually contain between about 5 and about 50 percent by weight of the active ingredient, and optionally, small amounts of spreading agents, dispersing agents, and other conventional adjuvants.

The following examples will illustrate the formulation of a number of fungicidal and nematocidal compositions within the scope of the invention, but are not to be construed as limiting the same:

Example I

| | Lbs. |
|---|---|
| Trimethyl thiophosphite | 2.0 |
| Attapulgus clay | 2.5 |
| Aluminum silicate | 40.0 |
| Powdered blood albumen | 0.2 |

The ingredients are thoroughly admixed in a ball mill to obtain a fungicidal dusting composition.

Example II

| | Lbs. |
|---|---|
| Trimethyl thiophosphite | 2.0 |
| Walnut shell flour | 40.0 |
| Petroleum sulfonates | 0.3 |

The ingredients are thoroughly mixed in a ball mill to obtain a dry concentrate composition which can subsequently be dispersed in water to form a spray.

The compositions provided by the invention may be employed in any of the various manners employed in the pest control art. For the control of foliage fungi, the compositions are conventionally applied directly to the plant in the form of a liquid spray or dry dust. Soil fungi are controlled by applying the composition to the soil itself, followed by harrowing or the like. For the control of nematodes, the compositions are usually formulated in liquid form, and are applied either to the plant itself or to the soil as a spray or drench, or are applied as a root dip to bare root stocks. In general, then, any of the customary methods of application may be employed.

As a demonstration of the activity of a typical member of the present class of composition against a typical soil-borne fungus disease, samples of soil infested with *Rhizoctonia solani* were mixed with 200 parts per million of trimethyl thiophosphite in the form of a 5 percent solution in dioxane. The treated soil was allowed to stand for two days, and was then planted with cotton seeds and placed in the greenhouse. Subsequent examination of the plants and comparison of the same with control plants grown in untreated soil showed the trimethyl thiophosphite to have effected excellent control of the fungus. When nematode-infested soil was treated in the same manner with 200 parts per million of trimethyl thiophosphite, and tomato plants were planted in the treated soil, excellent control of the nematodes was secured and the plants showed significantly improved growth over control plants growing in untreated soil. In tests carried out in vitro with fungi grown in Sabouraud's liquid media, trimethyl thiophosphite in a concentration of 100 parts per million provided 95–100 percent control of *Rhizoctonia solani, Pythium ultimum, Fusarium roseum, Alternaria solani,* and *Aspergillus niger*. It was also effective in controlling the bacteria, *Pseudomonas syringae* and *Agrobacterium tumefaciens*.

Other modes of applying the principle of my invention may be employed instead of those explained, change being made as regards the methods or materials employed provided the products or steps stated by any of the following claims, or the equivalent of such stated products or steps, be obtained or employed.

I therefore, particularly point out and distinctly claim as my invention:

1. The method of controlling the growth of fungi and nematodes which comprises supplying to the habitat thereof a fungicidal and nematocidal amount of trimethyl thiophosphite.

2. The method of claim 1 wherein the said trimethyl thiophosphite is supplied in admixture with an inert pesticidal carrier material.

3. The method of controlling the growth of soil-borne fungi and nematodes in soil infested with the same which comprises admixing a fungicidal and nematocidal amount of trimethyl thiophosphite with said infested soil.

4. The method of claim 3 wherein said trimethyl thiophosphite is employed in admixture with an inert pesticidal carrier material.

5. The method of protecting plants from attack by fungi and nematodes which comprises applying to said plants a fungicidal and nematocidal amount of trimethyl thiophosphite.

6. The method of claim 5 wherein the said trimethyl thiophosphite is employed in admixture with an inert liquid pesticidal carrier material.

References Cited in the file of this patent

UNITED STATES PATENTS

| | | |
|---|---|---|
| 2,542,370 | Stevens | Feb. 20, 1951 |
| 2,682,554 | Crouch | June 29, 1954 |

OTHER REFERENCES

Hackh: Chemical Dictionary, The Blakiston Co., 1944, p. 616.

Frear: Chemistry of Insecticides, Fungicides and Herbicides, 2nd ed., 1948, D. Van Nostrand, pp. 280–287.